GLASS-SEALED SEMICONDUCTOR CRYSTAL DEVICE

Filed March 31, 1950 5 Sheets-Sheet 1

INVENTORS.
HARPER Q. NORTH
JUSTICE N. CARMAN JR.
BY
N. T Volsk
BY THEIR ATTORNEY INVENTORS
HARPER Q. NORTH
JUSTICE N. CARMAN JR.
BY
N. T. Vohn.
BY THEIR ATTORNEY INVENTORS.
HARPER Q. NORTH
BY JUSTICE N. CARMAN JR.
N. T. Volk
BY THEIR ATTORNEY

GLASS-SEALED SEMICONDUCTOR CRYSTAL DEVICE

Filed March 31, 1950 5 Sheets-Sheet 4

INVENTORS.
HARPER Q. NORTH
JUSTICE N. CARMAN JR.
BY N. T. Volsk
BY THEIR ATTORNEY INVENTORS.
HARPER Q. NORTH
BY JUSTICE N. CARMAN JR.
N. T. Votak
BY THEIR ATTORNEY

United States Patent Office 2,694,168

Patented Nov. 9, 1954

2,694,168

GLASS-SEALED SEMICONDUCTOR CRYSTAL DEVICE

Harper Q. North, Los Angeles, and Justice N. Carman, Jr., Tarzana, Calif., assignors, by mesne assignments, to Hughes Aircraft Company, a corporation of Delaware Application March 31, 1950, Serial No. 153,102

61 Claims. (Cl. 317—234)

This invention relates to germanium crystal diodes, transistors, photo-transistors, Hall-effect devices, and more particularly to germanium crystal devices of the above type which are mounted in glass-sealed envelopes.

Recent developments, in civilian and especially in military use of electronic components, have imposed entirely new and unprecedented operating requirements on crystal devices. For example, the operating temperature range has been extended to include temperatures from −55° C. to +90° C., and the impact and shock requirements have been increased many fold.

The disclosed devices may be operated over a temperature range of from −80° C. to 90° C. without causing permanent damage to their electrical or mechanical properties. None of the crystal devices in the prior art has been able to satisfy these requirements.

The invention will be described, by the way of an example, in connection with germanium elements. It is to be understood, however, that the teachings of this invention are applicable to other monatomic semi-conductor crystal members, that is a crystal composed of a chemical element exhibiting electrical conductivity intermediate that of metals and insulators, such as silicon. This is especially the case when non-oxidizing atmosphere, such as neon, nitrogen, or helium is used in glass envelopes described hereinafter.

No one skilled in the art has considered it practicable to heat the germanium crystal, in constructing such devices, above the melting point of tin, which is 232° C., since it generally has been considered that, if germanium is heated to higher temperatures, it would undergo permanent changes of electrical characteristics which would impair permanently its performance either because of surface oxidation or because of changes within the crystalline structure of germanium. (See "Crystal Rectifiers," by Torrey and Whitmer, M. I. T. Radiation Laboratories Series, vol. 15, p. 366, McGraw-Hill Book Co. 1948.) Accordingly, in the prior art the materials used for making housings, surrounding the crystal, generally have been in the class which could not withstand more than 180° C., which is the melting point of solder used for sealing in the housings. Efforts have been made by the prior art to solve the problem by actually using glass envelopes, but the final mounting of the crystals generally culminated in soldering joints between some metal parts to avoid heating of crystals. Since the melting point of solder is of the order of 180° C., it is obvious that the assembly of this type is only as good as its weakest link. Thus, the weakest link melting away at 180° C. has prevented the use of all-glass mounting or envelopes in the existing crystal assemblies. Attempts have also been made to encase crystals in metallic envelopes with metallic plugs at one end and glass plugs at the other end, but the actual end-sealing of the envelopes is obtained by solder, melting below 180° C., or by plastics-paste plugs which deteriorate at the higher, as well as the lower, limit of the required temperature range. Inability to withstand the tempertaure range by plastics is not the only deficiency introduced by them into the crystal assemblies. They, at least some of them, are moisture-transparent, if not initially, then certainly upon being subjected to temperature cycling, and hence these plastics make the crystal assemblies fail prematurely. Additional factors making use of plastics as envelopes undesirable are: expansion of plastics due to moisture absorption; large coefficient of expansion; strain relieving upon release of molding temperature and pressure, which produces dimensional changes; and flexibility of plastics at higher temperatures. Thus, various ways of incorporating the most suitable known plastics into devices have limited drastically their life, and have prevented the use of such devices over the specified temperature range. To illustrate the limited temperature range of the assemblies known to the prior art, it may be stated that few of them can withstand temperatures beyond 100° C., while the devices herein described will withstand temperatures of the order of 500° C. The well-recognized deficiencies of the prior art assemblies also include: large dimensions which, in many applications, preclude altogether their use when space is at a premium; moreover, large dimensions also mean correspondingly large thermal expansions and contractions and, what is especially important, differential expansions or contractions with the concomitant drastic variations in performance of crystal elements, since such performance is a function of pressure existing between the cat-whisker and the germanium crystal when such electrode is used. Some of the prior art units are also pervious to moisture and, hence, have limited life; practically all have high capacitance to ground with the result that ultra-high frequencies become shunted to ground; they also possess relatively low resistance to axial tensional stresses and bending stresses, such low resistance to stresses being reflected at once in the state of contact between the cat-whisker and the crystal; yet it is this contact that determines the electrical characteristics of diodes, transistors, and photo-transistors disclosed in this application.

The invention discloses novel crystal device assemblies which substantially overcome all of the above defects, and it also discloses novel methods for making such assemblies. It has been discovered that it becomes feasible to use glass envelopes, glass being almost an ideal material for such devices, by reducing their size to the dimensions which are of the order of 0.09" diameter and 0.2" length, by devising novel methods for obtaining glass seals without impairing the properties of the crystalline structure of germanium; this is being accomplished either by shielding the crystals from a source of radiant energy used for obtaining the glass seals, or by subsequently annealing, gradual cooling, and electrolytic cleaning and treating that portion of the germanium crystal's surface which eventually is used for making contact with the cat-whisker in diodes and with the emitter and collector in transistors. Still in other methods disclosed here the germanium crystal is protected from oxidation at the points or surface used for establishing electrical contacts by prior electroplating of such surfaces so that subsequent heating of the crystal is incapable of producing any detrimental effects on the contact areas. The same principles also apply to the Hall-effect devices also disclosed in this application. The invention also discloses methods during some stages of which either some part, or the entire device, is subjected to a temperature as high as 620° C., and then annealed at approximately 450° C., then at 550° C., and subsequently cooled gradually to room temperature for relieving stresses due to high cooling and for conversion of P-type germanium to N-type. The resulting structures are capable of withstanding more than from −80° C. to +500° C. temperature cycling, are moisture proof, have very long life, negligible capacity to ground, are shock resistant, and have higher resistance to tension and bending stresses than the devices of the prior art. Since crystal diodes are the only devices suitable for ultra-high frequency uses, it becomes a matter of prime importance to reduce all stray capacitances to an absolute minimum to avoid shunt effects. In the disclosed devices, by reducing their dimensions to a practical mechanical ultimate minimum, and by introducing the glass envelope, such stray capacitances have been reduced materially.

It is therefore one of the principal objects of this invention to provide electronic crystal devices of semi-conducting or unidirectional conducting crystals mounted in glass envelopes with substantially negligible overall and differential expansions in response to large temperature changes or temperature cycling, such lack of differential expansion producing devices with stable and superior electrical characteristics.

It is an additional object of this invention to produce electronic crystal devices of exceptionally small size and mounted in glass envelopes filled with air or inert gas, the produced devices having practically negligible stray capacitances, being completely impervious to moisture and therefore having long useful life.

It is an additional object of this invention to provide electronic crystal devices which are capable of acting as rectifiers, detectors, modulators, mixers, oscillators, harmonic generators, voltage regulators, amplifiers, some of the above responding from direct current input to frequencies extending into the ultra-high frequency spectrum, including millimeter waves, and to provide crystal devices suitable as current, voltage, flux, etc. metering devices.

An additional object of this invention is to provide novel methods for making germanium crystal devices including fabricating steps subjecting germanium crystals to temperatures which are sufficiently high to produce glass-to-glass and glass-to-metal seals and subsequent steps for annealing and gradual cooling of germanium for obtaining uniform N-type germanium and for converting P-type germanium to N-type if some P-type germanium appears in the process of making these devices.

It is also an object of this invention to provide novel methods of protecting some surfaces of semi-conductive crystals from oxidation by means of oxidation-resisting metallic layers or coatings, using these coatings for establishing glass-to-metal seals capable of withstanding high temperature, and masking the crystal and established connections with the exception of only a certain portion of the crystal from subsequent etching operations.

Still another object of this invention is to provide novel methods for obtaining electro-chemically cleaned and treated crystal surfaces devoid of any oxides which are produced on unprotected portions of crystals during the process of obtaining a first glass-to-glass and glass-to-metal seal.

It is also an object of this invention to provide a novel method for obtaining glass-to-glass and glass-to-metal seals in the course of making electronic crystal devices by using a radiant energy source, by precisely controlling said source, by directing the heat energy from said source against a very small zone, and by shielding the crystal containing part of the devices from the heat energy.

A further object of this invention is to provide monatomic crystal devices mounted in vitreous envelopes in which a direct vitreous gas-tight seal exists between the envelope and the electrodes connected to the crystal.

Another object of this invention is to provide monatomic crystal devices mounted in sealed vitreous envelopes in which the only gas-tight seals are vitreous seals, that is glass or glass-like seals.

It is also an object of the invention to provide monatomic crystal devices mounted in sealed envelopes in which all of the elements surrounding the crystal are capable of withstanding temperatures of the order of 500° C.

It is a still further object to provide monatomic crystal devices mounted in sealed vitreous envelopes in which the electrical connections to the crystal are composed solely of metal having a melting point higher than the melting point of said envelope.

Still another object is to provide a crystal device in which the crystal is connected to an electrode by means of an electrically conductive vitreous bond.

It is an additional object of this invention to provide crystal devices mounted in solid vitreous envelopes in which a direct vitreous seal exists between the envelope and the crystal.

It is an additional object of this invention to provide crystal devices in which the contact pressure between an electrode and the rectifying surface of the crystal is maintained by a solid vitreous envelope.

It is also an object of this invention to provide the novel features which we believe to be characteristic of the invention as set forth particularly in the appended claims. The invention itself, however, both as to its organization, method of operation, and method of manufacture, together with further objects and advantages thereof, may best be understood by reference to the following description taken in connection with the accompanying drawings in which:

Figures 18, 19, 20, 21, 22, 23:
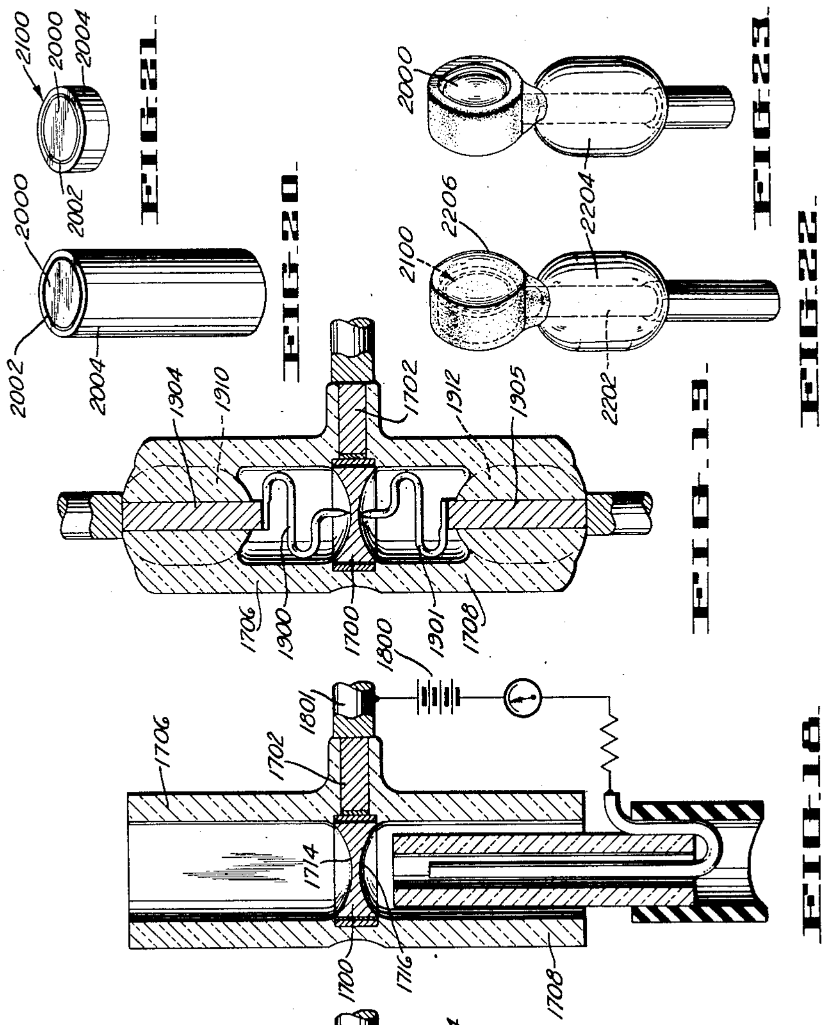
Figure 17:
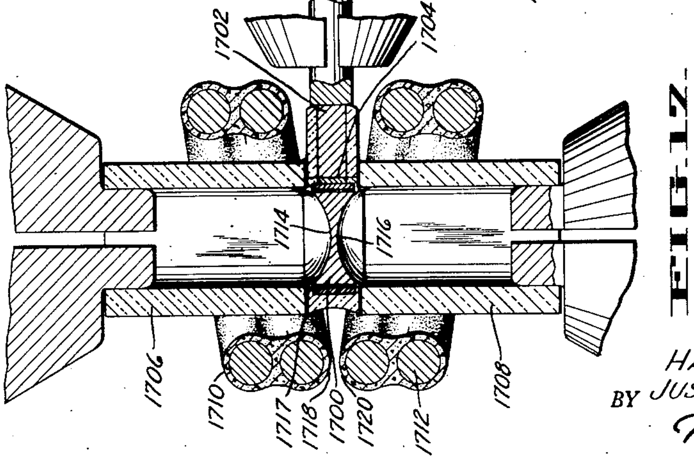
Figure 17A:
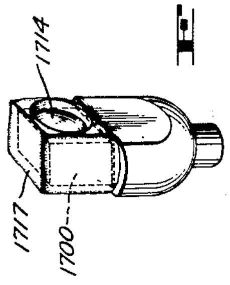
Figures 24, 25, 26, 27, 28, 29:
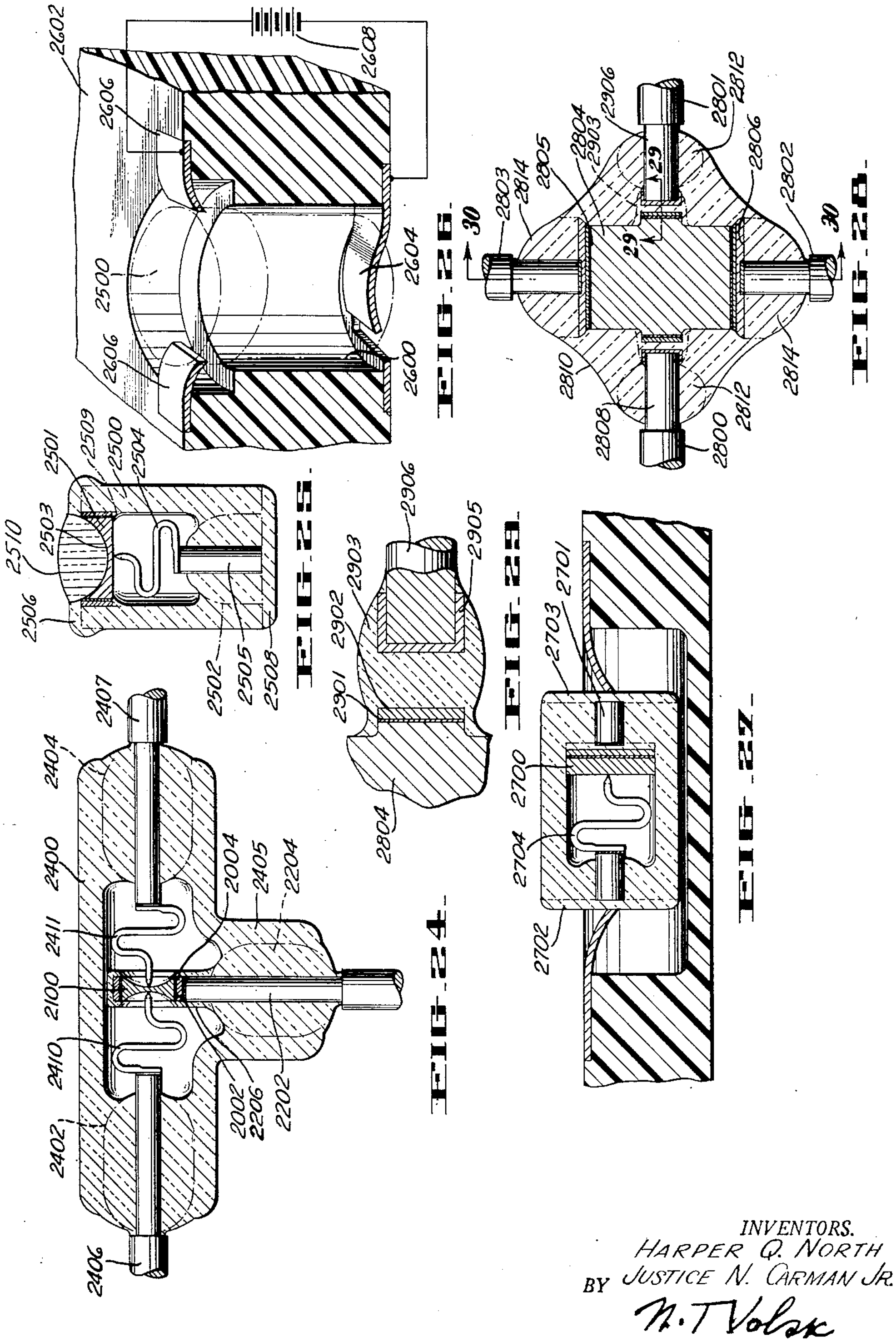
Figures 30, 31, 32, 33, 34:
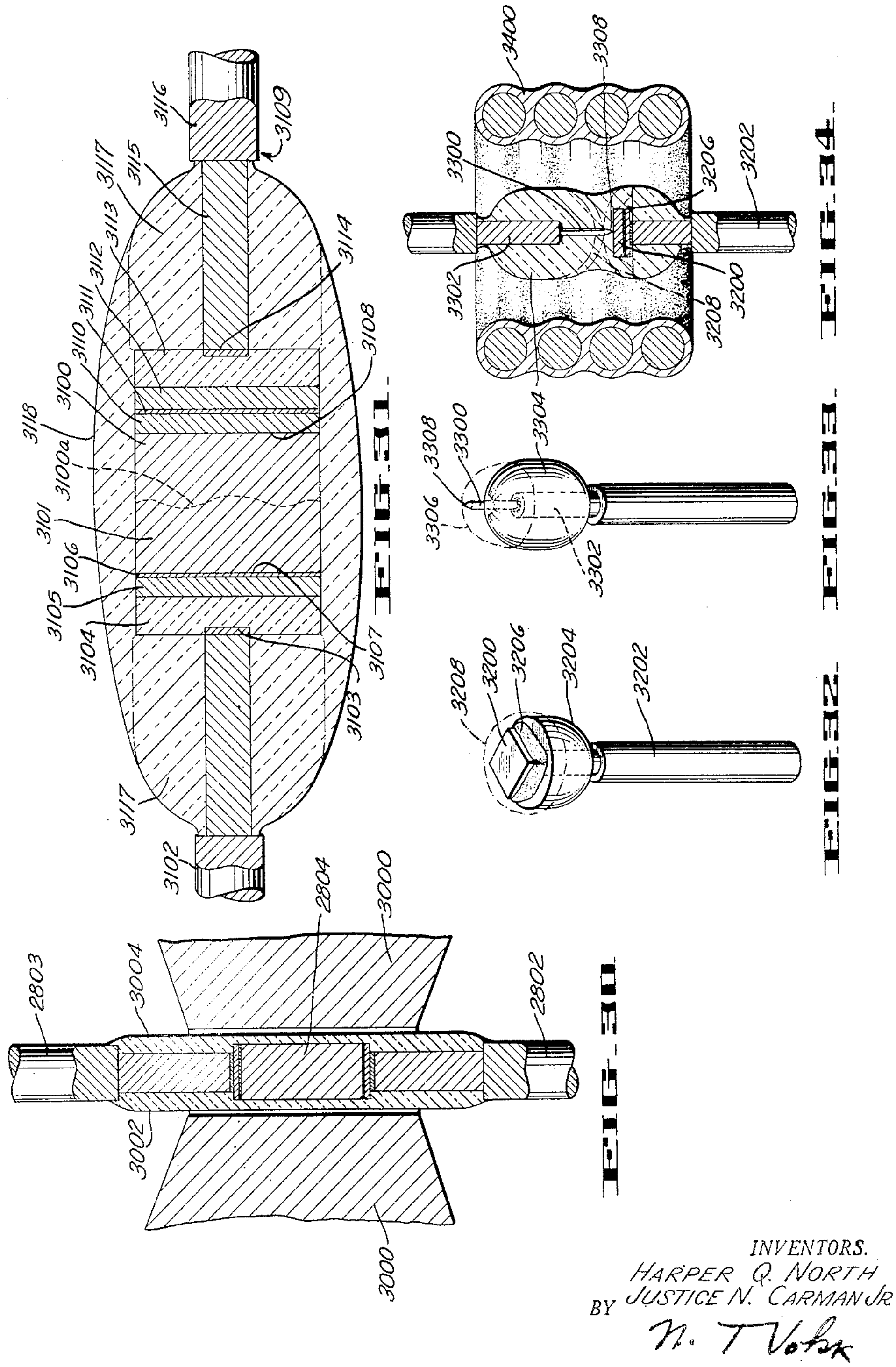

Figs. 17, 18, and 19 illustrate longitudinal cross-sectional views of a coaxial transistor during some of the stages of its assembly, the completed transistor appearing in Fig. 19;

Fig. 17A is a perspective view of a crystal mounting used in Figs. 17 through 19;

Fig. 20 is a perspective view of a plated crystal rod used for making the transistor illustrated in Fig. 24;

Fig. 21 is a perspective view of the disc sawed off the rod, illustrated in Fig. 20;

Fig. 22 is the perspective view of the disc illustrated in Fig. 21 after it has been covered with a glaze and mounted on a lead wire-bead combination;

Fig. 23 is a perspective view of the crystal element illustrated in Fig. 22 after it has been vitrified and ground out;

Fig. 24 is a longitudinal cross-sectional view of the transistor utilizing the crystal element illustrated in Fig. 23;

Fig. 25 is a longitudinal cross-sectional view of a photo-transistor;

Fig. 26 is a perspective longitudinal cross-section of a socket used in connection with the photo-transistor illustrated in Fig. 25;

Fig. 27 is a longitudinal cross-sectional view of a diode inserted in a socket;

Fig. 28 is a sectional plan view of a Hall-effect device;

Fig. 29 is an enlarged sectional view of an electrode-crystal connection in the Hall-effect device illustrated in Fig. 28, the sectional view being taken along line 29—29 of Fig. 28;

Fig. 30 is a sectional view of the same Hall-effect device taken along line 30—30 of Fig. 28;

Fig. 31 is a longitudinal sectional view of a P-type-N-type rectifier;

Fig. 32 is a perspective view of a crystal mounting used in a diode illustrated in Fig. 34;

Fig. 33 is a perspective view of a lead wire-bead-electrode combination used in a diode illustrated in Fig. 34;

Fig. 34 illustrates a cross-sectional view of a diode surrounded with a source of radiant energy used in the process of making the diode.

Similar reference characters are applied to similar elements, whenever a single electronic device is illustrated by several figures.

Figures 12, 13, 14, 15, 16:
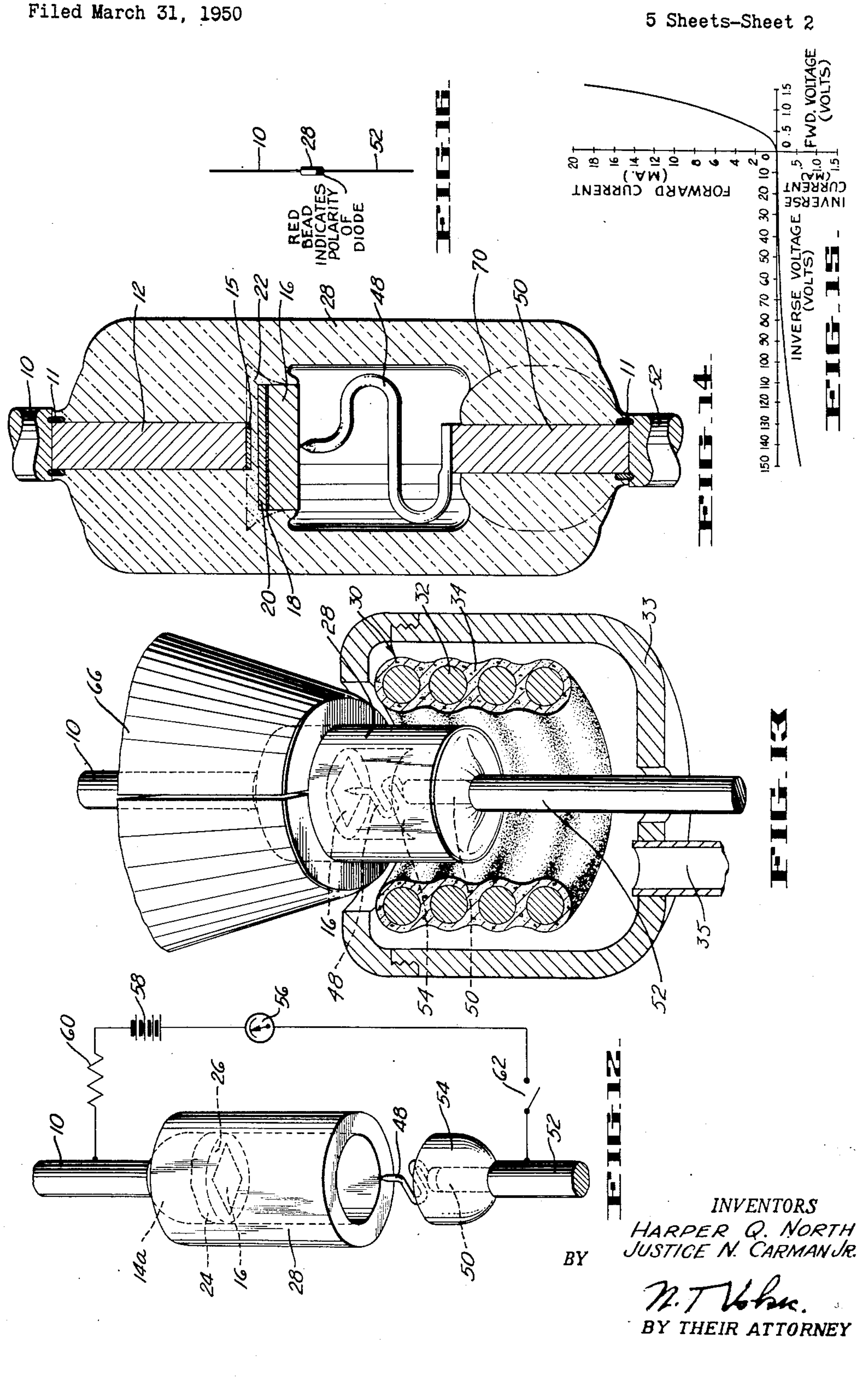
Fig. 15 illustrates a typical performance curve of the diode illustrated in Fig. 14.
Fig. 16 illustrates a side-view of a completed diode in its actual size.

Referring to the drawings, Figs. 1 through 9 illustrate successive steps in making the crystal-mounting part of the diode; Figs. 12 and 13 illustrate successive steps used in making the electrode or cat-whisker part of the diode and assembling of the entire diode; and Fig. 14 illustrates the diode in its completed form.

Figures 1, 2, 3, 4, 5, 6, 7, 8, 9, 10, 11:
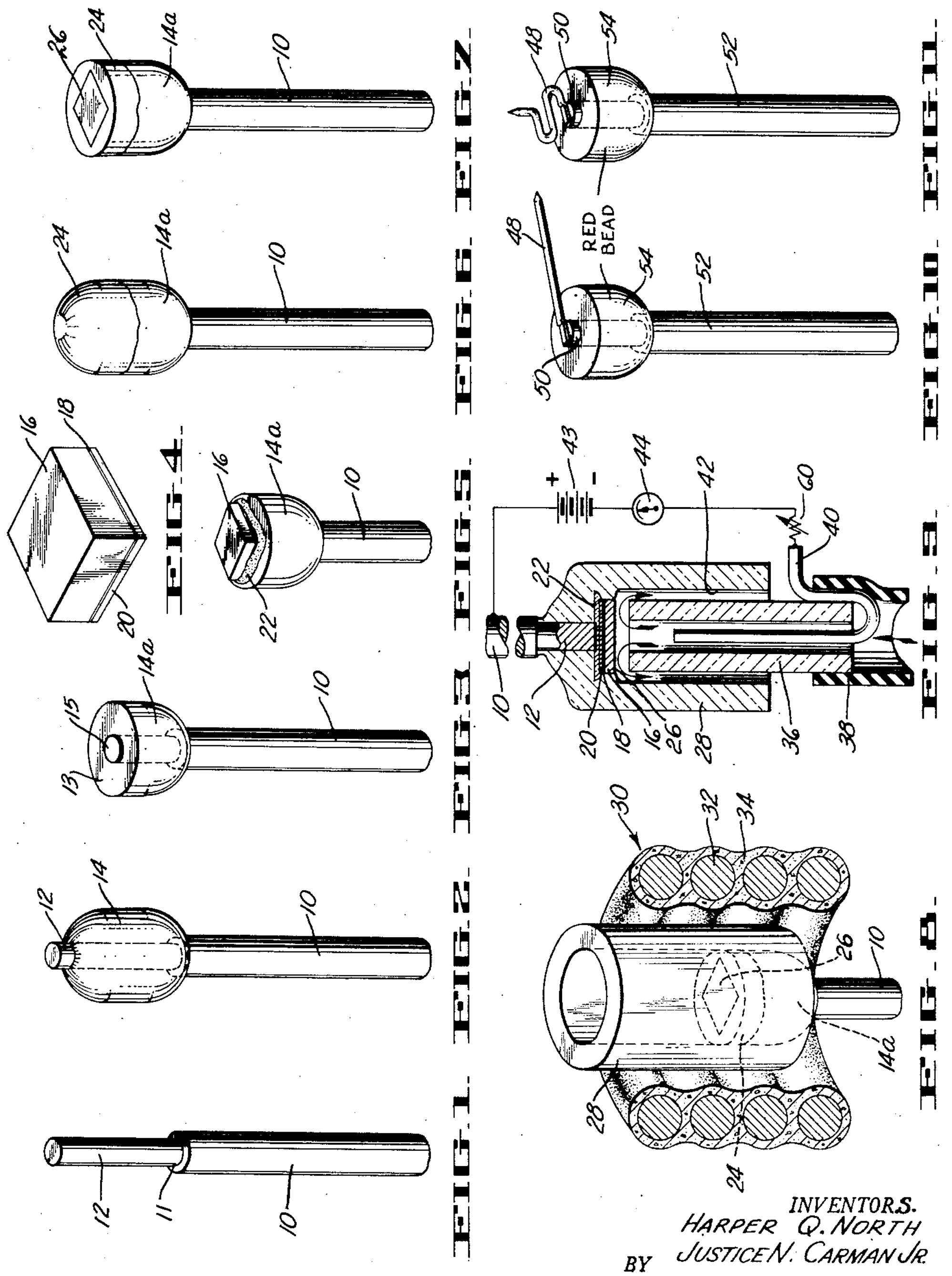
Figs. 1 through 14 illustrate a crystal diode in its various stages of assembly, Fig. 14 being a longitudinal cross-sectional view of the completed diode.

Fig. 1 illustrates a tinned copper wire 10 with a "Dumet" wire 12 forming a welded joint 11 with the copper wire. For a more complete disclosure of the "Dumet" composition and its properties see U. S. Patent No. 1,140,136 to E. E. Elder, and "Glass-to-metal seals," by Albert W. Hull and E. E. Burger, "Physics," 5–384, December 1934, and especially page 396. It is preferable to use "Dumet" in the contemplated structures rather than "Kovar," since "Dumet's" thermal expansion properties "match" thermal expansion of low melting point glass, used here, better than "Kovar" although both such materials have melting points higher than the melting point of the glass used in this invention. The above "matching" is facilitated by copper-coating wire 12. The diameter of wire 10 is of the order of 0.02″, and its length is of the order of 1.2″.

As illustrated in Fig. 2, a glass bead 14 is slipped over wire 12, whereupon the combination is heated at 1000° C. to cause bead 14 to melt and fuse to wire 12 which remains in a solid state, thereby sealing bead 14 to wire 12. After subsequent annealing, the upper half of bead 14 and the protruding portions of wire 12 are then ground off square, leaving only the lower portion 14a of the bead, the upper surfaces of which are polished to smoothness with 300–600 mesh alumina or silicon carbide. The exposed portion of wire 12 is then copper-plated, which produces copper layer 15 used for establishing a positive mechanical and electrical bond between wire 12 and a conductive vitreous bond, such as a silvered glass bond, as described hereinafter. A small germanium element, in a form of a block 16, which subsequently is mounted on surface 15, is illustrated in Fig. 4; in the illustrated example, it is approximately 0.020″ thick, and its square sides are of the order of 0.040″ long. In the illustrated example, it consists of extrinsic germanium, that is germanium with a minimum amount of impurities or germanium to which has been added about 0.2 or 0.5 atomic per cent of antimony, or arsenic, or other known impurities which may act as donors, or acceptors, as discussed hereinafter. These blocks are made from highly purified germanium, cast into a relatively large ingot (not illustrated) which is cut into wafers (not illustrated), and subsequently into blocks 16, illustrated in Fig. 4. The germanium wafer's flat surfaces are polished to smoothness with 600 mesh alumina, and then one side of the wafer is first copper-plated, and then silver-plated, for establishing a stable and low electrical resistance connection between the outer silver layer 20 and the germanium block 16. Copper layer 18 is interposed between germanium element 16 and silver layer 20 to permit better adherence between the silver and the germanium. The silver prevents oxidation of the copper. These metallic layers also act as cushioning layers in preventing cracking of the bond during sealing.

The next step in making the diode is illustrated in Fig. 5. It consists of establishing a low resistance path between copper layer 15 and block 16, and at the same time integrating the block, the lead wires and the bead into a single structure by means of a positive, rigid, electrically conductive vitreous bond, that is a bond formed of material which has been vitrified by heating the material to its fusing or melting point. This is accomplished with the aid of a "silver paste," such as Du Pont Silver Paste #4731, consisting of low melting point glass powder, flaky silver, binder, and volatile fluid, such as turpentine, alcohol, etc. The vitrification point of this paste is of the order of 620° C. For a more detailed description of such pastes, reference is made to "New Advances in Printed Circuits," United States Department of Commerce, National Bureau of Standards, Miscellaneous Publication 192, page 15, which is hereby made a part of this disclosure. While the above powder gives satisfactory results, other known silver pastes having glass as a base and having a melting point of the order of 620° C., or slightly lower, may be used. In order to mount block 16 on the polished surfaces 15 and 13, these two surfaces are coated with silver paste 22, and block 16 is placed on top of the paste. Since the dimensions of block 16 and the outer diameter of the glass bead 14 are so adjusted that the diagonal dimension of the block is somewhat smaller than the diameter of the bead, paste 22 substantially surrounds the lower edges of the block in the manner illustrated in Fig. 5. The method of protecting the bond between block 16 and glass bead 14*a* from subsequent etching of the upper surface of the germanium block 16 is described below.

Upon mounting of block 16 on bead 14*a*, in the manner described above, the block and the upper portion of bead 14*a* are coated with a low melting point glaze 24 in the manner illustrated in Fig. 6. It is this glaze 24, after it is vitrified, that protects the electrical connection between block 16 and wire 12 when the upper surface 26, Fig. 7, of the germanium block is subjected to electrolytic cleaning and treating, which will be described more fully in connection with Fig. 9. Moreover, glaze 24 enhances the mechanical strength of the assembly so that the obtained devices are capable of resisting mechanical shocks of unprecedented severity. The glaze used in the illustrated example utilizes a lead-borosilicate glass known in trade as "BQ–1 Flux" made by Harshaw Chemical Company, Cleveland, Ohio. Other low melting point glazes, or silicate flux powders, mixed with volatile substance such as turpentine or alcohol for transforming the powder into an adhering paste, are equally suitable for this purpose so long as the following rule is observed: The selection of the paste or glaze is made so as to correlate the softening points of the glaze with that of the silver paste for vitrifying the two in one single step. The softening point of the glaze, used in the particular example ("BQ–1 Flux"), is reached at approximately 580° C. while, as it may be recalled, the softening point of the silver paste is approximately 620° C. Therefore, when the entire assembly is transferred to an oven, the temperature of which is of the order of 620° C., there is vitrification of the two pastes which unites the germanium block 16 with bead 14*a* and wire 12 through the newly formed vitreous bond. Since the silver paste 22 is composed, in the main, of flaky silver dispersed in glass powder, the silver flakes become dispersed, during the firing of this paste, through the hard glassy body of the bond so that the bond has relatively low electrical resistance. The resistance of such joint between wire 12 and block 16 in the described example is of the order of 0.1 ohm.

Thus, restating once more the functions performed by the respective parts illustrated in Figs. 4, 5 and 6, the copper-layer 18 is used to establish an excellent mechanical and electrical bond with the crystal on one side and with the silver layer on the other side; the copper layer 18 acts as a flash plate to which both germanium and silver adhere readily. The silver layer 20 is used for establishing an equally good bond electrically and mechanically between the copper layer on one side and the conductive silvered glass bond 22; the outer glaze coating 24 protects the electrical path, composed of block 16, copper layer 18, silver layer 20, conductive glass bond 22, copper layer 15, wire 12, and finally outer lead wire 10, from subsequent attack by phosphoric acid during the subsequent electrolytic cleaning and treating process. It is important to stress here that the electroplated layers of copper and silver also prevent any possibility of oxidizing that surface of the germanium block on which they are plated during the glazing operation, at which time the entire assembly is heated up to 600° C.

The glazing operation involves two steps, the first step consisting of driving off the volatile substance used for converting the glaze powder 24 into paste, i. e., to drive off turpentine or alcoohl, etc., and the second step, producing actual glazing of flux 24 and of the silver paste. A temperaature of the order of 100° C. is used for the first step and, as mentioned previously, the glazing temperature is of the order of 600° C. The thickness of the outer glaze seal 24, formed upon its vitrification, is of the order of 0.002″ or 0.003″ thick. Because of the extremely small masses involved in the vitrification process, the latter is completed in a relatively short period of time, of the order of 10 minutes, whereupon the temperature of the furnace is brought down and the assemblies are cooled to room temperature over a period of one or two hours. This tends to anneal the outer glaze seal 24, the conductive glass bond 22, and the germanium block 16 by relieving the strains that are apt to remain in these elements if the assembly were to be subjected to rapid cooling. It is to be noted that the outer glaze seal 24 forms an exceptionally firm bond with the germanium crystal.

Experience has shown that the thermal coefficients of expansion of the materials used are sufficiently close, although perhaps not exactly identical, to make this entire assembly capable of withstanding a large temperature range as from −80° C. to +500° C., and such sudden thermal shocks as complete momentary immersion into liquid nitrogen (−195° C.).

The excellence of the obtained mechanical and electrical bond is also important for the following additional reason: The firm, high melting point bond, between the germanium block 16 and wire 10, permits rapid conduction of heat away from the crystal surface to the larger mass of the assembly, and even if momentary high temperatures exist, they do not melt away the glass and metal bonds in the disclosed structure. Because of this condition, average currents as high as 120 ma. can be obtained from the diode used as a half wave rectifier, as compared to 50 ma. withstood by the best diodes known to the prior art. Normally, in many a structure disclosed by the prior art, this current would heat the crystal to such high temperatures as to melt the low melting point soldered connections used for integrating the electrical path, which would terminate the life of such diode at this point.

Since at this stage the entire germanium block is coated with the outer glaze seal 24, it becomes necessary to remove the upper part of this seal for exposing that surface of the crystal which will engage the pointed electrode or cat-whisker of the diode. This is performed by grinding off the upper layer of the glaze seal with 600 mesh alumina, which exposes the upper surface 26, Fig. 7, of the germanium block for its subsequent engagement with the electrode after etching.

Fig. 8 illustrates sealing of a glass cylinder 28 to the glass bead 14*a*. A glass cylinder which, in the illustrated example, is 0.2" long, has an outside diameter of 0.09" and an inner diameter of 0.06", is slipped over bead 14a with which it forms a sliding fit. During this step, wire 10 and glass cylinder 28 are held in a jig, not illustrated, for holding the two parts of the assembly in fixed relationship with respect to each other. Actual fusing or coalescing of cylinder 28 to bead 14a is accomplished by using a radiant energy source 30.

Source 30, in the illustrated example, consists of four turns of 0.02" diameter platinium-10% ruthenium wire, ruthenium being added to platinum for prolonging heater life and for increasing its electrical resistance; other suitable platinum alloys may be made with iridium or rhodium. The coil 32 is embedded in an insulating cement 34 so that the heating element assumes the form of a hollow cylinder, the inner diameter of which is made so that the heating element is as close to the glass cylinder 28 as practical mechanical tolerances permit, without actual touching of the cylinder by the coil. Thus, some of the coils have the inner diameter of the order of 0.12" and the overall height of 0.1". Accordingly, the clearance between the coil and the glass cylinder is of the order of 0.015". The insulating cement 34 may consist of any suitable porcelain or glass cement with sufficiently high melting point to resist high temperature produced by platinum coils. A number of commercial cements, such as well-known "Sauereisen" No. 7 and No. 78 satisfy this requirement. The only requirements which must be met by the cement is that it must form a high electrical resistance coating, which is hard, possesses requisite mechanical strength, and can withstand a temperature of 1400° C.–1500° C. Since a large number of cements are capable of satisfying this requirement, it is obvious that other cements may be used for the specified purpose.

It is fitting to mention here that, in the described illustrative example of the source of radiant energy, one of the reasons for imbedding the coil in the cement is to avoid evaporation and the concomitant condensation of platinum on the outer wall of the glass cylinder 28 when the coil is raised to its operating temperature of the order of 1350° C. Such condensed layer of platinum on glass acts as a reflector for radiant energy produced by the coil and, as a consequence, it prevents raising the temperature of the lower part of the glass cylinder sufficiently to produce effective and quick sealing of the cylinder to the glass bead.

In order to obtain this seal, the coil is connected to a 2-volt-source of alternating potential producing a 15 ampere current in the coil. This raises the temperature of the coil to from 1300° C. to 1400° C. The extreme lower portion of the glass cylinder is softened and becomes fused or coalesced to the glass bead in about 40 seconds from the time of closing the coil circuit. The actual control of this sealing operation is obtained, as a matter of convenience, by measuring voltage across the coil rather than by measuring any temperatures. It is to be noted here also that there must be a careful alignment of the coil, the lower portion of cylinder 28, and bead 14a to prevent excessive oxidation of the exposed surface of the germanium block itself.

While the invention has been described in connection with the source of radiant energy of the type illustrated in Fig. 8, any other type of radiant energy source is also suitable, it being understood that the term "radiant energy source," when used in this application, signifies a source of heat energy which, for all practical purposes, transfers its energy to the object to be heated by means of wave radiation, although theoretically other forms of heat transmission may occur simultaneously. Thus, for example, good results have been obtained by using the nickel-iron resistance wire ("Nichrome") which does not require any cement casing since the alloy, when heated to from 1300° C.–1400° C., forms a protective oxide coating. This coating prevents any evaporation of metal, and its subsequent condensation on the glass cylinder.

This sealing step constitutes one of the important and definitely critical operations in the process of manufacturing the diode. Thus, it has been discovered that the outlined sealing method, as far as is known to the applicants, constitutes the only satisfactory and entirely successful method for obtaining the sought result. For example, heating of the glass cylinder, directly with gas flame produces fatal oxidation of the crystal and overheating of the glass cylinder 28 on one side, and underheating on the opposite side, so that the obtained seals are either unsatisfactory or, if proper sealing is obtained, the crystal is impaired beyond any possible subsequent recovery. The softening temperature of the glass suitable for cylinder 28 is of the order of 630° C., as is the softening temperature of the glass used for making bead 14. Examples of such glass are what is known in trade as Corning Glass 0010 and Corning Glass 0120. Substantially the softening temperature of the glass used for cylinder 28 and of bead 14a, i. e., 630° C., must be attained for obtaining the seal.

The crystal assembly is then transferred into an annealing oven where it is annealed at 450° C. for five minutes. This type of annealing is necessary for quickly relieving stresses which may arise because of comparatively quick cooling of the newly-formed glass seal, the bead, and the glass cylinder. Without such annealing, the glass parts are apt to crack of their own accord.

This type of annealing, however, is unsufficient for annealing the germanium crystal to remove distortions in the lattice structure and, therefore, in order to obtain proper annealing of the crystal itself, the assembly is transferred to an oven where it is heated for two hours or more at 550° C. and cooled slowly to room temperature. This higher temperature anneal, to remove lattice distortions, nullifies the P-type tendencies which may arise because of them. The P-type tendencies which may be present in unannealed germanium are clearly detrimental to N-type rectification.

A more detailed explanation of the above annealing and conversion of the germanium crystal from P-type to N-type is as follows: The impurities contained in germanium oxide, as received from the supplier, cause the germanium semi-conductor to be N-type. If this material is heated above the melting point in an oven to 800° C., and quickly chilled, it converts to P-type. This conversion was at one time thought to be caused by the quick freezing out of arsenic on the grain boundaries. However, more recent studies indicate that the conversion to P-type may be caused by lattice distortions. These distortions are merely displacements of the germanium atoms from their normal positions in the crystal. If the atoms are so displaced, traps are created for electrons, and the traps act like acceptors. If the material is annealed, however, by a prolonged heating at about 550° C., the crystal slowly takes on its characteristic lattice structure. Upon annuealing at 550° C., the lattice distortions are removed and the germanium must be cooled slowly to prevent further lattice distortions from arising. Thus, when the crystal is heated for two hours or more at 550° C., the P-type crystal is converted from P-type back to N-type, if prior rapid cooling did produce some P-type crystals in the predominantly N-type mass, and subsequent gradual cooling from 550° C. to room temperature prevents the lattice distortions and conversion from appearing again. The end product, therefore, is N-type germanium.

During prior heating of the crystal, some germanium oxide is formed on the exposed face 26 of the crystal, and this oxide layer must now be removed. This is accomplished by electrolytic cleaning and treating process which also may be referred to as etching or electrolytic polishing. The crystal treating operation is performed in the manner illustrated in Fig. 9. As in the preceding figure, the illustrated parts are held in a jig or jigs, which are not illustrated since they do not constitute a part of this invention. The etchant is introduced through a fine glass tube 36 connected to a rubber hose 38, which in turn is connected to a reservoir containing the etching solution of 2% phosphoric acid. The phosphoric acid solution is furnished through hose 38 at the rate of about 5 cc. per minute. Tube 36 has an inner diameter of 0.020" and an outer diameter of approximately 0.050", so that toroidally-shaped clearance 42 exists between tube 36 and the inner wall of glass cylinder 28. The clearance between the upper end of tube 36 and the crystal is of the order of 0.010". The phosphoric acid rises in glass-tube 36, as illustrated by the arrows, comes in contact with the crystal surface 26, and then discharges through the toroidal passage 42. The acid cannot reach the other surfaces of crystal 16, since these other surfaces are protected by the vitreous bond between crystal 16 and cylinder 28 formed by glaze 24. Since the position of germanium on the electropositive element scale is not sufficiently high to produce a reaction with 2% solution of phosphoric acid at room temperatures and, moreover, there is a necessity of replacing oxygen in germanium oxide with the phosphoric acid radical, it becomes necessary to force this reaction by impressing positive potential, in the indicated manner, on face 25 of the crystal. The end product, soluble in the solution, is carried away by the stream of electrolyte. To accomplish this, a conductor 4 is connected to the negative pole of a direct current source 43 through a variable resistor 41 and a meter 44, while the positive terminal is connected to wire 10 which now makes electrical connection with the face 26 of the crystal. The etching period is of the order of one minute with current of approximately 20 miilliamperes.

It is found that the above treatment adequately removes foreign substances from the germanium, leaves the surface clean, and removes stressed layers which are formed in the cutting and grinding. The surface is made bright and frequently takes on a high polish. Either condition is usually concomitant with good rectification. The final test of any surface is of course electrical. Good electrical characteristics are the final criterion of the state of the surface.

The electrolytic cleaning and treating process is performed at this stage of making diodes since previous heating of the germanium block 16 produces the oxide coating which must be removed, and the surface is given a high polish which is necessary for obtaining optimum electrical characteristics in some of the disclosed devices. Subsequent steps in making diodes are conducted and designed so as to avoid any possible change in the polished surface through oxidation, on any other harmful influences.

The remaining steps in manufacturing the diode consist of spot-welding the cat-whisker 48 to the exposed end of the "Dumet" wire 50, the wire being in part surrounded with a glass bead 54. The copper wire 52 and the "Dumet" wire 50 are identical to those illustrated in Fig. 2, while bead 54 is identical in shape with bead 14*a*, but is colored red for convenient visual identification of the cathode-anode positions in the diode. Such identification is desirable because the size of the diode is so small that it would otherwise require the use of a magnifying lens. Cat-whisker 48 may be made of platinum-10% ruthenium alloy, having a length of the order of 0.135", a diameter of the order of 0.003", and it is provided with a pointed cone-shaped end, the angle of the cone being of the odder of 60°. Other types of points, such as wedge-shaped points, may be more suitable in some applications, as is discussed more fully in chapter 8 of vol. 15 of Torrey and Whitmer, previously identified. It is also known in the art that such metals as tungsten and Phosphor bronze are suitable for making cat-whiskers. The whisker is provided with an S-shaped twist which gives it the necessary resiliency. 10% of ruthenium is added to platinum for increasing the stiffness of the whisker, while platinum is generally selected for resisting any subsequent oxidation, in the course of succeeding manufacturing stages of the diode.

The last stages include the insertion of the whisker assembly into the germanium crystal assembly as illustrated in Fig. 12, and sealing of cylinder 28 to bead 54 in the manner illustrated in Fig. 13. Insertion of the cat-whisker into cylinder 28 includes two steps: First, making contact with the germanium block, and second, advancing the whisker assembly approximately 0.002" in order to obtain positive contact between the whisker and the block. The point of contact is determined by using a meter 56, a source of potential 58, a resistance 60, and a switch 62, the instant of obtaining contact being indicated on the meter. Care should be taken to have sufficiently high resistance to avoid excessive heating of the block and the cat-whisker.

The method of obtaining the actual seal between cylinder 28 and bead 54 is identical to that used in sealing cylinder 28 to bead 14*a*, except that it now is important to take every precaution to preserve the rectifying surface of the crystal as well as the entire crystal from any excessive oxidation which otherwise may impair its electrical properties. This is accomplished by, first, surrounding the crystal with a heat-absorbing means, such as chuck 66, and, second, by using the source of radiant energy 30 which localizes heating only to the desired portion of the glass cylinder and enables one to have a very fine control over the amount of heat used. The same heating coil 30 and meter circuit are used for obtaining the seal, but the crystal end of cylinder 28 is now enclosed in chuck 66, which, besides holding the lower part of the diode in a fixed position with respect to bead 54 and whisker 48, also acts as a conductor of heat away from the crystal. The current and the length of time required for obtaining the seal are identical to those used in connection with the establishment of the lower seal between cylinder 28 and bead 14*a*. As in the previous case, the newly formed seal is annealed at 450° C. for five minutes and is cooled gradually down to room temperature over a period of one or two hours.

The above procedure of obtaining the final seal is eminently successful when germanium crystal material is used. Additional precaution for preventing surface oxidation may be desirable when silicon is used instead of germanium. This is obtained by surrounding coil 30 with a metal jacket 33 having a tube 35 connected to a source of helium, nitrogen, or other inert gas. A stream of this gas then envelops the entire assembly and fills glass cylinder 28, thus replacing oxygen of the air within the envelope with an inert atmosphere. The flow of gas is continued throughout the sealing operation.

The last step in making the diode consists of stabilizing the contact by passing a current through it which welds the cat-whisker's tip to the crystal. The same circuit may be used as that illustrated in Fig. 12 by closing a meter-shunting switch 62, and adjusting the resistance 60 to produce a momentary current of 350 to 400 milliamperes. For a more detailed description of welding cat-whisker's tip to the crystal, reference is made to U. S. application of H. Q. North et al., S. N. 743,492, filed April 24, 1947, and entitled "Crystal Diode." Although the above welding of the tip to the crystal produces a more electrically-stable contact area, this step is discretionary, since comparable results are obtainable by eliminating this step, or by using a pulsing process as described in "Crystal Rectifiers," by Torrey and Whitmer, M. I. T. Radiation Laboratories Series, vol. 15, pp. 370–371, McGraw-Hill Book Co., 1948. This completes the assembly of the diode.

It should be noted here that while Figs. 10, 11, 12, and 13 illustrate bead 54 as being ground off square at its outer end, the same bead is illustrated in Fig. 14 as being a full size bead 70. Two alternative procedures may be used, and it is for this reason that Figs. 10 through 13 illustrated a ground off bead while Fig. 14 illustrates a full size bead. When a full size bead, such as bead 70 in Fig. 14, is used then the procedure of mounting the bead and welding cat-whisker 48 to the protruding end of the "Dumet" wire is as follows: The bead, such as bead 14 in Fig. 2, is strung on a "Dumet" wire and a glass-to-metal seal is then established in an oven or by using open flame. The longitudinal dimension of the bead is somewhat shorter than the length of the "Dumet" wire with the result that the "Dumet" wire protrudes from the bead in the manner illustrated in Fig. 2. The cat-whisker 48 is then welded to the protruding end and the "Dumet" wire in the manner described in connection with Fig. 10. It is obvious that the full-size bead construction is simpler than the one illustrated in Figs. 10 through 13.

The actual size of the diode is illustrated in Fig. 16. It is apparent from the perusal of this figure that the diode does represent an ultimate in smallness and therefore the parasitic inter-electrode capacitances and capacitance to ground reach their absolute minimum because the very size of the device itself also reaches practicable minimum. This is discussed more fully in the succeeding paragraphs. This ultimate in smallness is attained by positioning crystal 16 in direct proximity to the glass-to-metal seal at one end of cylinder 28, and by positioning cat-whisker 48 in direct proximity to the glass-to-metal seal at the other end of cylinder 28. Thus, as shown in Fig. 14, the overall length of the diode is determined by the summation of the extents of the glass-to-metal seals, the length of cat-whisker 48, and the thickness of crystal 16.

The characteristic curve of the diode, illustrating its forward current and its back voltage characteristics, is illustrated in Fig. 15. Forward currents at one volt, as high as 20 milliamperes, and a reverse voltage current at −50 volts, which is as low as 5 microamperes, is typical of the obtained diodes.

The most important advantage of the disclosed diodes may be summarized as follows: The diode is completely enclosed by a glass envelope which is moisture-proof, is an excellent insulator, and has a low dielectric loss. Since only glass and glass-to-metal seals are used throughout the entire assembly, the disclosed diodes can withstand temperature cycling as large in range as −80° C. up to +500° C. (−112° F. up to approximately 932° F.), without any adverse effects, and it is this large temperature range that permits the use of this diode under most adverse temperature conditions. These new uses occasionally subject these diodes to such low temperatures as −55° C. and as high temperatures as +90° C. It is a matter of established fact that the only suitable material now available, which can withstand such wide operating temperature range, and which also possesses excellent insulating properties, must be in a class of silicate glasses. It has been universally considered and accepted by the prior art that the use of glass envelopes, completely enclosing germanium diodes, is precluded because any glass vitrifying, fusing, sealing, or coalescing processes would, of necessity, require prohibitively high temperatures which certainly would damage the crystal as a rectifier. The disclosed techniques have accomplished the long sought ideal, and it is to be noted that this ideal has been accomplished together with the retention of the highest performance standards obtainable with the germanium crystals.

As previously mentioned in the introductory part of this specification, diodes of this type are especially suitable as detectors, or rectifiers, for the highest portion of the radio frequency spectrum. Even the smallest parasitic interelectrode capacitances, or capacitance to ground, may prove to be crucial in such applications and, therefore, every possible effort must be made to avoid the introduction of such capacitances. In the disclosed diodes, these capacitances have been reduced to an absolute minimum by making the diodes almost the ultimate in smallness, by substituting and by using glass envelopes and direct glass-to-metal seals between the envelope and each of the wires.

The disclosed diode also has substantially matched thermal coefficients of expansion throughout its envelope, thus approaching an ideal structure devoid of differential expansion; such differential expansion may affect diodes of the prior art electrically by changing their characteristics and, in an extreme case, mechanically by breaking the cat-whisker contact; because of all-glass construction, the diode is shock resistant, and is capable of withstanding all accelerations found in known applications.

In the past decade, great strides have been made in developing miniaturized radio circuits using the so-called printed circuits. Some circuits of the above type use a ceramic base with silver paste fired into the ceramic base to form low resistance paths for interconnecting various portions of such circuits. Since the disclosed diodes utilize glass and metal construction, they may be used to an advantage in the circuits of the above type because they can withstand relatively high temperatures at the time they are being connected to such circuits.

As stated in the introductory part of the specification, the disclosed methods and combinations are applicable not only to the diodes, but also to other devices which use a monatomic semi-conductor crystal member as a medium for controlling currents or voltages. Thus, application of the disclosed methods to a coaxial transistor is illustrated in Figs. 17, 17A, 18, and 19. A germanium disc 1700 is mounted on a "Dumet" wire 1702 in the same manner as disc 16 in Fig. 5, with the exception that in the transistor structure the disc is mounted on one of its sides so that the two larger "face" areas of the disc may be utilized for making contacts with two pointed electrodes, or cat-whiskers 1900 and 1901, in Fig. 19. These electrodes are known as an emitter and a collector and wire 1702 as a base electrode in the transistor art. The germanium discs, such as disc 1700, are obtained by first copper-plating a germanium rod (not illustrated, but similar to that of Fig. 20), then silver-plating it, and finally cutting it into discs. The discs are then provided with concave surfaces 1714 and 1716 by means of a grinding operation. The electrical connection, between the ground-off end 1704 of wire 1702 and the germanium disc, is an electrically conductive vitreous bond identical to that used between germanium block 16 and wire 12 in Fig. 5; i. e., the exposed end 1704 of wire 1702 is copper-plated and then joined to the outer silver layer on the germanium disc with the silver paste. The periphery of the germanium disc and the glass bead are then coated with a flux 1717, whereupon the two glass tubes 1706 and 1708 are mounted on the top and bottom of disc 1700 in the manner illustrated in Fig. 17. If necessary, additional amounts of the flux are applied around the junction formed between the germanium disc, the glass bead, and the glass tubes 1706 and 1708, so as to fill completely all joints with the flux. Care is taken to keep the concave surfaces 1714 and 1716 clean and uncontaminated with the flux. The glass tubes and the disc assembly are then surrounded by two heater coils 1710 and 1712, which meet on one side of the tube at surfaces 1718 and 1720. These coils, in their construction and mode of operation, are comparable in every respect to coil 30, previously described in connection with Figs. 8 and 13, and therefore need no additional description. Because of the T type construction of the illustrated assembly, it becomes necessary to use split coils. All parts are first heated to approximately 100° C. to drive off turpentine, and the temperature is then raised to approximately 620° C. for about one minute, which at once vitrifies the silver paste and the flux.

The concave surfaces 1714 and 1716 are then etched in the manner illustrated in Fig. 18. The etching technique with 2% solution of phosphoric acid is identical to that illustrated in Fig. 9; the disc is made more electropositive by connecting it to the positive terminal of a direct current source 1800 over wire 1801, thus forcing the reaction between the phosphoric acid radical and the germanium. The etching technique is performed in two steps by etching the surfaces 1714 and 1716 independently. As in the diode of Fig. 14, the other surfaces of crystal 1700 are protected from the acid during the etching operation by the vitreous bond between crystal 1700 and tubes 1706 and 1708 formed by flux 1717.

The remaining steps in making the coaxial transistor become self-evident upon the examination of Fig. 19. These steps include spot-welding of the cat-whiskers 1900 and 1901, preferably made of Phosphor-bronze, to the respective "Dumet" wires 1904 and 1905, inserting the cat-whisker assemblies into the glass cylinders 1706 and 1708, advancing of the whiskers 0.002″ after they make contact with the crystal and, finally, simultaneously sealing of the glass cylinders 1706 and 1708 to the glass beads 1910 and 1912. All of the above steps are accomplished in the manner identical to that described in connection with the diode shown in Fig. 14, and therefore need no additional description. It should be noted here that the points of contact of the cat-whiskers with the crystal are positioned along the longitudinal axis of the assembly, as shown in the figure.

The advantages of the type of transistor illustrated in Fig. 19 are identical to those obtainable with the diode of Fig. 14; namely, it is capable of withstanding especially large temperature cycling; it is impervious to moisture; it can resist violent shocks; it has low interelectrode capacitance; it possesses stable performance characteristics because of negligible differential expansion, and small size and low thermal coefficient of expansion of the glass envelope encasing the transistor; and no adverse effect is experienced by the transistor per se when it is subjected either to axial tension or compression.

Figs. 20, 21, 22, 23, and 24 disclose an additional modification of a transistor. The advantage of the construction illustrated in Fig. 24 resides in the fact that the germanium disc 2100 is farther removed from those areas which are subjected to most intense heating. Therefore, the possibility of permanently injuring the germanium disc during sealing in operations is avoided more effectively with this construction. The germanium disc is made as follows: A germanium rod 2000 is plated with a flash coating of copper 2002, and subsequently with approximately 0.005″ of outer layer of nickel 2004. The rod is then sliced into discs 2100. After a glass bead 2204 is slipped over the "Dumet" wire 2202, and sealed to wire 2202, disc 2100 is butt-welded to wire 2202. The nickel layer 2004 should be of sufficient thickness to obtain a welded joint without "breaking through" the layer and into the crystal at the time of making this weld. The disc is then covered with a glaze 2206, Fig. 22, of the type illustrated at 24 in Fig. 6, and the glaze is vitrified at 620° C. Disc 2100, now covered with the vitrified glaze 2206, is then provided with two concave surfaces, as illustrated in Fig. 24, by grinding them out through the glaze. The crystal combination is then inserted into a T-shaped glass vessel 2400 and bead 2204 is sealed to wall 2405 of the vessel, in the manner described previously. The concave surfaces of the crystal are then cleansed and treated with 2% phosphoric acid in the manner described previously in connection with Fig. 18. It is to be noted that all metal parts are fully protected from the action of the phosphoric acid by the vitrified glaze 2206 which extends all the way down to the glass bead 2204 and the glass walls of vessel 2400. Accordingly, that portion of the crystal which is covered with the glaze, forms a vitreous bond with the glass vessel. The next step consists of joining cat-whisker-glass bead combination 2402—2410 and 2404—2411 with the glass-vessel 2400. These steps are identical to the sealing operation described in connection with Fig. 13 where source 30 is used for obtaining the identical seal between bead 50 and the glass vessel 28. The sealing operation is followed by annealing of the seals and of the crystal as in the case of the diode illustrated in Fig. 14. Accordingly, since the detailed description of these steps has been given previously, there is no necessity of repeating it here. The glass beads 2402 and 2404, wires 2406 and 2407, and cat-whiskers 2410 and 2411 are identical in their construction to the same elements in Fig. 19. The cat-whiskers engage two oppositely spaced points on the concave portions of the crystal; the method of insertion and establishment of contact between the crystal and the cat-whiskers has been described previously in connection with Figs. 12 and 14.

The advantage of the structure illustrated in Fig. 24, as compared to that illustrated in Fig. 19, resides in the fact that, since the germanium disc is separated from the glass bead 2204 by means of a length of the "Dumet" wire 2202, and is also separated from the glass beads 2402 and 2404 by the lengths of the cat-whiskers 2410 and 2411, subsequent sealing of the glass beads to the glass tube exposes the germanium to the high temperatures used during the sealing operations to a lesser extent here than it is the case in Fig. 19. Therefore, there is less of a possibility of forming germanium oxide on the concave surfaces of the crystal when the beads are sealed to the glass tube.

Figs. 25 and 26 disclose application of the teachings of this invention to a photo-transistor. Fig. 25 discloses a cross-sectional view of the photo-transistor, while Fig. 26 discloses a perspective cross-sectional view of the same transistor shown in phantom inserted in a portion of a so-called printed circuit. Referring to Fig. 25, the photo-transistor consists of a glass tube 2500, a germanium disc 2501, with an outer concave surface 2503, a glass bead 2502, a cat-whisker 2504, a "Dumet" wire 2505, vitrified silver paste seals 2506 and 2508, and a glaze seal 2509. The conductivity of this photo-transistor is controlled by the amount of light intercepted by the outside concave surface 2503 of the germanium disc. Glass tube 2500, bead 2502, and wire 2505 are sealed together as in the previous structures, and a conductive surface at the ends of the diode is furnished by the silvered glass seals 2506 and 2508, which are obtained upon vitrification of the silver pastes.

Assembling of the photo-transistor is as follows: Germanium disc 2501 is obtained in the same manner as disc 2200 in Fig. 22. It is then vitrified to the glass tube 2500 by means of glaze 2509 and silver paste 2506, and etched on the inside. In this manner, a vitreous bond is formed between glass tube 2500 and disc 2501. The outside is ground concave and subsequently etched. Insertion of the cat-whisker assembly and obtaining a seal between bead 2502 and glass tube 2500 is identical to that described in connection with Figs. 12, 13, and 14. After addition of the silver paste layer 2508, the exposed concave surface 2503 is electrolytically cleaned and treated with 2% phosphoric acid, as heretofore described. The surface may be left in this condition without further treatment. However, for additional protection from handling and oxidation, it will be found that a layer of arsenic sulfide glass ($As_2S_3$) produces an excellent coating 2510. For a more detailed description of arsenic sulphide glass, reference is made to Bulletin of the American Physical Society, vol. 25, Number 2, March 16, 1950, entitled "Programme of the Oak Ridge Meeting at Oak Ridge, Tenn. March 16–17–18, 1950," and particularly to page 11, Item E9, entitled "New optical glass transparent in the infra-red up to 12 microns," by R. Frerichs, Northwestern University. The coating 2510 is transparent to infrared light of wavelengths to which the photo-transistor is most sensitive (one to two microns). The arsenic sulfide glass window can be added in the following manner. The entire assembly is heated to approximately 100° C. and a drop of molten $As_2S_3$ is placed in the concavity of the germanium. The outer surface of the solidified drop can then be ground and polished to shape suitable for focusing light upon the center of the sensitive concave surface opposite the cat-whisker if desired.

Adaptability of this arrangement to printed circuits 2602 is illustrated in Fig. 26. The photo-transistor is inserted into a socket 2600. The printed circuit connections are illustrated at metallic contact portions 2604 and 2606 which are connected to a source of potential 2608. Contact portions 2604 and 2606 are adapted to be connected to elements 2506 and 2508, respectively, which constitute the electrical conductors or electrodes of the photo-transistor.

These same techniques are equally applicable for making a germanium crystal diode of the type illustrated in Fig. 27. Since all the elements illustrated in Fig. 25 are similar to those illustrated in Fig. 27, no detailed description of this figure is necessary. The chief difference resides in the fact that the outer end of the germanium disc 2700 now is connected to a "Dumet" wire 2701 through a silvered glass in the manner identical to that disclosed in Fig. 11, the silvered glass constituting an electrically conductive vitreous bond, and there are now two flat silvered glass end seals 2702 and 2703. Cat-whisker 2704 is identical to cat-whisker 48 in Fig. 12.

The principal feature of the photo-transistor, illustrated in Fig. 25, and of the diode illustrated in Fig. 27, is their applicability and ease of their use in the printed circuits; the additional advantages are the same as those outlined in connection with the previously described diodes and transistors.

Figs. 28 through 30 illustrate the application of the methods outlined previously to a Hall-effect device. In the devices of this type, suitable potential is impressed across electrodes 2802 and 2803 connected to the germanium block 2804. The germanium block is also subjected either to a constant or variable magnetic flux produced by a permanent magnet 3000 (Fig. 30) when permanent flux is used or a similarly positioned electro-magnet when a variable flux is used. In the latter case, the current flowing through the electro-magnet coil may be a variable current. The principle of operation of the Hall-effect devices is based upon the fact that the current normally flowing between electrodes 2802 and 2803 may cause a variable potential to arise between electrodes 2800 and 2801, when either the potentials between the electrodes 2802 and 2803, or the flux produced by the magnet, or the electro-magnet, are varied. Devices of this kind may be used as amplifiers, multipliers of two currents, flux meters, power meters, etc.

In constructing the Hall-effect device according to the teachings of this invention, the electrodes 2802 and 2803, which are identical to the electrode illustrated in Fig. 3, each are connected to the germanium block 2804 through an electrically conductive vitreous bond, in identical manner as electrode 12 is connected to the germanium block 16 in Fig. 14, i. e., a silvered glass seal is used between the electrodes and the germanium block, and the block surfaces 2805 and 2806 are first copper-plated and then silver-plated. To avoid short-circuiting block 2804 by low resistance connections between the electrodes, electrodes 2800 and 2801 are connected electrically to block 2804 through an electrically conductive vitreous bond in a manner illustrated on an enlarged scale in Fig. 29. A copper layer 2901 and a silver layer 2902 are obtained by first plating all peripheral sides of the germanium block and grinding off the plated layers on two sides, except for the portions indicated in Fig. 29. A silver paste layer 2903 is interposed between the copper-plated layer 2905 at the end of the "Dumet" wire 2906 and the silver layer 2902. Therefore, the limited area electrical connection that is achieved at this point consists, in the sequence indicated, of the "Dumet" wire 2906, its copper-plated layer 2905, silver paste 2903, silver layer 2902, and copper layer 2901 on the germanium crystal. The same type of connection is used at the end of the "Dumet" wire 2808. From the above, it follows that the electrical connection between the electrodes 2800, 2801, and block 2804 are identical to those illustrated in Fig. 14, except their area is limited approximately to the cross-sectional area of the respective wires 2906 and 2808. Thus, there is no direct low-resistance metallic connection between any of the "Dumet" wires, except through the germanium crystal itself so that the crystal becomes a part of the electrical circuits. In order to integrate mechanically the illustrated assembly, it is coated with a borosilicate glaze 2810, the physical properties of which are identical to glaze 24 in Fig. 6. The entire assembly is then heated to approximately 620° C., vitrified, and subsequently annealed in the manner described previously. An ordinary oven is used at this time because all germanium surfaces of importance are protected against oxidation by the electro-plated layers of copper and silver. Accordingly, the entire assembly comprises a vitreous envelope 2810 bonded to block 2804 and sealed to each of the wires through beads 2812 and 2814. The cross-sectional view of the obtained Hall-effect device is illustrated in Fig. 30. The two sides 3002 and 3004 of the device are ground flat to the dimensions of the air gap of a permanent magnet. The advantages of the Hall-effect device are identical to those which have already been enumerated.

Fig. 31 discloses a coaxial N-P-type diode in which the cat-whisker has been eliminated altogether since the rectification is obtained at the boundary plane formed by the P-type and N-type regions within the crystal. This boundary plane is indicated diagrammatically by a line 3100*a*. The connection between electrode 3102 and the P-type portion of the germanium crystal is of the type illustrated in Fig. 5, and therefore needs no detailed description. Suffice to say that the copper-plated end 3103 of lead wire 3102 is connected to the P-type portion of the crystal through silvered glass 3104, silver-plated layer 3105, and copper-plated layer 3106, the latter being plated directly on the P-type surface 3107 of the crystal. The method of connecting the N-type surface 3108 to a lead wire 3109 differs from that just described only in one respect; a conductive donor layer 3110 of antimony, arsenic, or phosphorus is plated on surface 3108 of the germanium, which is followed by a copper layer 3111, silver layer 3112, silver paste 3113, and finally a copper-plated end 3114 of a "Dumet" wire 3115 spot-welded to a copper wire 3116. Each of lead wires 3102 and 3109 has a glass bead 3117 fused thereover in a manner identical to the electrode of Fig. 3. The entire assembly is coated with a low melting point glaze 3118 of the previously mentioned lead-borosilicate type, and the combination is then heated in a furnace at 600° C. for obtaining vitrification of glaze 3118 and of the silver paste layers 3104 and 3113. During this vitrification process, sufficient diffusion of the donor metal into the adjacent portion of the germanium crystal takes place up to plane 3100*a* within the crystal. The position of this plane is determined by the degree of infusion of the donor, and this in turn is determined by the type of donor material used, and temperature and length of time used for vitrifying the glaze and the silver paste. Upon completion of the vitrification, the assembly is cooled off gradually in the furnace. This annealing relieves the stresses in the vitrified portions of the assembly, and may extend the rectifying boundary 3100*a* somewhat deeper into the crystal.

An explanation of the effect of diffusion of the donor material into the germanium crystal is set forth at pages 64 to 67 of "Crystal Rectifiers," supra. As stated in the reference, donor materials generally are elements with five valence electrons and of about the same atomic dimensions as germanium. These elements substitute for a germanium atom in the lattice of the crystal, giving up an electron in order to produce a tetrahedral bond. Similarly, elements with three valence electrons accept an electron as a result of tetrahedral binding and create a free hole. Elements of the latter type are termed acceptor impurities. The result of the electronic action of these impurities is an alteration of the balance of holes and electrons in the crystal.

The diode disclosed in Fig. 31 represents the ultimate in simplicity, mechanical and electrical stabilities, ability to handle relatively large momentary overload currents because of the elimination of the weakest point in the preceding structures: the contact area between the whisker and the crystal. There is a complete absence of sympathetic mechanical vibration in this structure when the crystal is mounted on some mechanical support possessing some frequency spectrum of mechanical vibrations; this is so because the whisker, which is the element usually responding to such vibrations, is altogether absent in this version of the diode.

While the diode disclosed in Fig. 31 is especially suitable as a high current device, the current carrying capacity obtained by enlarging the contact areas, and therefore increasing the capacitance of the diode, may be an undesirable feature when the diode is used in the upper limit of the radio frequency spectrum. When this is the case, then the diode disclosed in Fig. 31 may be replaced with the type of diode disclosed in Fig. 34. The capacitance and current carrying capacity of this diode are comparable to those of the diodes using cat-whiskers.

The diode illustrated in Fig. 34 is made as follows: Crystal 3200 is mounted on a lead wire 3202, and a glass bead 3204 in the same manner as crystal 16 illustrated in Fig. 5. As in the preceding case, a silver paste 3206 is used between the silver plated layer and the "Dumet" wire-glass bead combination. A conductive vitrified bond is obtained between the crystal and the lead wire in an oven, and after the crystal-lead wire combination has been cooled gradually, it is covered with a glaze 3209, whereupon the assembly is heated at approximately 100° C. to drive off the volatile medium used for imparting pasty texture to the glaze. The electrode portion of the diode is made as follows: An electrode 3300, made of platinum-10% ruthenium, is welded to a "Dumet" wire 3302 whereupon a glass bead 3304 is slipped over the "Dumet" wire and the electrode; the combination is then heated in the oven to establish a glass-to-metal seal between the wire, the electrode and the bead. A conical point 3308 is then ground on the platinum alloy electrode. The upper portion of the bead is then coated with a glaze 3306, care being taken that the upper portion of the pointed electrode 3300 protrudes through the glaze in the manner illustrated more clearly in Fig. 34. The volatile medium is driven off as before so that the glaze then assumes the form of a packed dry powder. The crystal assembly illustrated in Fig. 32, and the electrode assembly illustrated in Fig. 33, are then superimposed on top of each other in the manner illustrated in Fig. 34, and the pressure exerted by the tip 3308 of electrode 3300 is adjusted by using any suitable pressure measuring gauge mechanism. The above-mentioned super position of the two parts of the diode is accomplished while the parts are surrounded by a source 3400 of radiant energy which essentially is identical to source 30 disclosed in Fig. 8. The two parts of the diode are then heated by a source 3400 until a vitrified seal is obtained which joins the two parts together. The results of such joining is a solid vitreous envelope which surrounds the electrode, the crystal, and the lead wires. Is should be noted here that the exposed surface of crystal 3200 must be etched or electro-polished and treated in the manner previously described in connection with Fig. 9 before the surface is covered with glaze 3208.

Comparison of the diode disclosed in Fig. 31 with that disclosed in Fig. 34 reveals the fact that while the diode of Fig. 31 has two large contact surfaces 3107 and 3108 on opposite sides of the crystal, and relatively large rectifying boundary area, illustrated by a dotted line 3100*a*, which all contribute to the current carrying capacity of this type of rectifier, the rectifier at Fig. 34 uses electrode element 3300 with the result that the rectifying boundary area is limited to only the metal-to-crystal contact between the tip 3308 of the electrode and crystal 3200. Accordingly, the current carrying capacity of this diode is correspondingly lower than that of the diode illustrated in Fig. 31. However, the parasitic capacitances are correspondingly lower than the same capacitances in the diode illustrated in Fig. 31. Accordingly, the diode of Fig. 34 is particularly suitable for its use in connection with the extremely high frequencies, which is also true of the diode illustrated in Fig. 14. It may be noted also that the inductance of electrode 3300 in Fig. 34 will be lower than the inductance of the cat-whisker 48, Fig. 14, which again makes the diode of Fig. 34 particularly suitable for extremely high frequencies.

While the invention has been described in connection with a crystal element possessing either a block or disc form, it is to be understood that crystals possessing different shapes are equally applicable and may be used in all of the devices disclosed here. For example, spherical crystal elements such as those disclosed in the co-pending application of Harper Q. North on "Germanium Pellets and Asymmetrically Conductive Devices Produced Therefrom," may be used in the disclosed devices. It is to be understood that when spherical crystal elements are used, then some portions of the spheres are ground off or provided with concave surfaces in the manner indicated in the disclosed figures to obtain the sought results.

It is also to be understood that all of the disclosed devices may have terminations of the type disclosed in Figs. 25 and 27, suitable for their use in printed circuits. As described in connection with the above-mentioned figures, the conductive vitreous seals, such as seal 2508, Fig. 25, or 2703 and 2702, Fig. 27, are used with the constructions of this type so that the lead wires as such are eliminated altogether and the silver of the seal constitutes the electrical conductor or electrode.

It is to be understood also that the type of construction shown in Fig. 34 could be used equally well in transistors. To form such a structure, a ground crystal of the type shown in Fig. 17A at 1700 is held in a support. The entire crystal structure 1700 is then coated with glaze in the manner identical to that described in connection with Fig. 32, except that in this case the entire crystal, including two concave surfaces, is coated with the glaze; the volatile matter (turpentine) of the glaze is then evaporated, which leaves the glaze adhering to the crystal assembly in a lightly packed form. The two electrodes, of the type disclosed in Fig. 33, including glaze 3306, are then advanced toward the crystal from two opposite sides, so that one electrode makes contact with one concave surface, while the other electrode makes contact with the opposite concave surface. The methods of making contact are identical to those described in connection with Fig. 12. In addition, as in the previous transistor art, current is passed through the contacts in the high resistance direction to improve transistor action. The entire structure is then integrated into a single unit by vitrifying the glaze in the previously described manner.

What is claimed as new is:

1. In an electrical translating device, the combination comprising a vitreous envelope, a member of monotomic semi-conductor material in said envelope, a vitreous bead at one end of said envelope forming a vitreous seal with said envelope, a lead wire passing through said bead, said wire forming a glass-to-metal seal within said bead and an electrical connection with said member, and a vitreous seal between said member and said envelope.

2. In an electrical translating device, the combination comprising an all-glass envelope, a semi-conductor crystal element mounted within said envelope, a metallic layer bonded to a portion of the surface of said element, and a vitreous bond between said envelope and said crystal element through said metallic layer.

3. An electrical translating device comprising a glass envelope having a plurality of glass seals, a corresponding plurality of metallic lead wires extending through and forming glass-to-metal seals with said glass seals, respectively, a crystal element mounted within said envelope, an electrical connection between each of said lead wires and said crystal element, and a glass seal between said crystal element and said envelope.

4. An electrical translating device comprising a glass envelope, glass seals forming a part of said envelope, metallic lead wires extending outwardly from and inwardly into said envelope through said glass seals and forming glass-to-metal seals with said glass seals, a many-sided semi-conductive crystal mounted within said envelope, a metallic layer bonded to one side of said crystal, an electrically conductive vitreous bond between said metallic layer and one of said lead wires and an electrical connection between another of said lead wires and another side of said crystal.

5. In an electrical translating device, the combination comprising a semi-conductor crystal element, a metallic coating on one portion of said element, a metallic lead wire having one end positioned adjacent said coating, and an electrically conductive fused glass element between said metallic coating and said adjacent end of said lead wire, said glass element including silver particles dispersed through the glass for making said glass element electrically conductive.

6. A current control device comprising an all-glass envelope, first and second glass beads at two ends of said envelope, said beads forming glass-to-glass seals with said envelope, first and second lead wires passing through said first and second beads respectively, said wires forming glass-to-metal seals within said beads, a member of semi-conductor material forming a vitreous and electrically conductive bond with said first bead and said first wire, and an electrode within said envelope interconnecting said second wire and said member.

7. A current control device comprising an all-glass envelope, first and second lead wires passing, respectively, through opposite ends of said envelope and forming glass-to-metal seals with said envelope, a member of semi-conductor material within said envelope, an electrically conductive vitreous bond between said member and said first wire, and an electrode connected to said second wire and forming an electrical contact with said member.

8. A current control device as defined in claim 7, and a metallized layer on a portion of the surface of said member, said vitreous bond forming an electrically conductive bond with said metallized layer.

9. A current control device as defined in claim 7, in which said member has a copper layer plated on a portion of the surface of said member, a silver layer plated on said copper layer, and said electrically conductive vitreous bond comprises fused glass powder and silver particles dispersed through said vitreous bond, whereby said member and said first wire are electrically connected through said copper and silver layers and silver particles dispersed through said bond.

10. A current control device as defined in claim 7, in which said member has a chemically treated portion of its surface, said electrode forming said electrical contact with said chemically treated portion of said surface.

11. A current control device as defined in claim 7, which also includes a fused vitreous layer surrounding said electrically conductive vitreous bond for protecting said bond against chemical attack.

12. A crystal diode comprising a hollow glass cylinder; first and second glass beads at two ends of said cylinder; said beads forming glass-to-glass seals with said cylinder; first and second lead wires passing through said first and second beads, respectively; said wires forming glass-to-metal seals within said beads, a multi-face crystal block having a metallic layer bonded to one of its faces, an electrically conductive vitreous bond between said metallic layer, said first bead and said first wire; a cat-whisker welded to the inner end of said second wire; and a chemically treated surface on the face of said crystal block opposite to the face having said metallic layer; said cat-whisker forming a contact with said chemically treated surface.

13. The method of producing crystal devices of asymmetrically conductive type including the steps of cutting a crystal wafer from an ingot of crystal material, polishing said wafer, electro-plating one side of said wafer with a metallic layer, cutting said wafer into crystal elements, fusing a vitreous bead onto a lead wire, grinding off a portion of said lead wire and said bead to produce a first wire-bead combination with a flat surface, coating said metallic layer of one of said elements and said flat surface with a silver paste, coating the remaining sides of said crystal element and the surface of said bead adjoining said element with a low-melting point glaze, and vitrifying said paste and glaze for uniting the crystal element with the wire-bead combination and for establishing a low-electrical resistance connection between said wire and said crystal element.

14. The method of producing crystal devices as defined in claim 13, which includes the additional step of grinding off a portion of said vitrified glaze for exposing one face of said crystal element, inserting the wire-bead-crystal combination into a hollow vitreous cylinder, surrounding only that portion of said cylinder engaging said bead with a source of radiant heat energy, and establishing a vitreous seal between said bead and said cylinder by radiating heat energy from said source.

15. The method of producing crystal devices, as defined in claim 14, which also includes the additional step of annealing the vitreous seal between said cylinder and said bead.

16. The method of producing crystal devices, as defined in claim 15, which also includes the additional step of annealing said crystal element for eliminating lattice distortions in said crystal element, and gradually cooling said element to room temperature for restoring the condition of the lattice structure of said crystal element to the original state of said lattice structure in said wafer.

17. The method of producing crystal devices, as defined in claim 16, which also includes an additional step of electro-chemically treating the exposed face of said crystal element.

18. The method of producing crystal devices, as defined in claim 17, which also includes the step of inserting a second bead-wire combination having a cat-whisker from the opposite end of said vitreous cylinder until said cat-whisker forms a positive electrical contact with the electro-chemically treated face of said crystal element, surrounding said other end of said vitreous cylinder with said source of radiant energy for obtaining a vitreous seal between said other end of said vitreous cylinder and said bead while shielding said crystal element from said source, and annealing said seal.

19. The method of producing semi-conductor crystal devices including the steps of placing a vitreous material containing metallic powder between said crystal and a lead wire, and heating said crystal, powder and wire for obtaining an electrically conductive vitreous bond between said crystal and said wire.

20. An electrical translating device comprising an N-type multi-faced germanium element, a copper layer bonded to one of the faces of said element, a silver layer bonded to said copper layer, a lead wire, and an electrically conductive vitreous bond between said wire and said silver layer, said bond including dispersed particles of silver to furnish a low-resistance path between said wire and said silver layer.

21. An electrical translating device comprising a semi-conductor block having first, second, third, and fourth surfaces along the periphery of said block; said first and second surfaces being at the opposite ends of said block; and third and fourth surfaces being at the remaining opposite surfaces of said block, first and second metallic layers on said first and second surfaces, respectively; first and second lead wires metallically and vitreously bonded to said first and second metallic layers, respectively; third and fourth metallic layers on only limited portions of said third and fourth surfaces, respectively; third and fourth lead wires metallically and vitreously bonded to said third and fourth metallic layers, respectively; and a solid glass envelope encasing said block and the portions of said wires adjacent to said block.

22. An electrical translating device, as defined in claim 21, which includes a source of magnetic flux surrounding said block, said flux being at right angles to the plane defined by the bonds of said wires to said block.

23. A current control device comprising a vitreous envelope, a crystal element substantially in the center of said envelope and having a pair of opposed faces, a metallic bonded layer surrounding the periphery of said crystal element, first and second glass seals at two opposite extremities of said envelope, a third glass seal constituting a part of said envelope, a first lead wire passing through said first seal and making contact with the face of said crystal element adjacent said first seal, a second wire passing through said second glass seal and making contact with the other face of said crystal element, and a third wire passing through said third glass seal, said third wire being metallically connected to the metallic layer surrounding the periphery of said element.

24. A crystal rectifier comprising a crystal element including a P-type zone, an N-type zone and a rectifying boundary between said zones, a first lead wire, a conductive vitreous path connecting said first wire to said P-type zone and forming a vitreous bond with said first wire, a second lead wire and a conductive vitreous path connecting said second lead wire to said N-type zone and forming a vitreous bond with said second lead wire.

25. A crystal rectifier comprising a crystal element having a P-type zone and an N-type zone, a lead wire connected to said P-type zone, a lead wire connected to said N-type zone, and a solid vitreous envelope surrounding said crystal element and forming a vitreous bond with said crystal element.

26. A crystal rectifier comprising a crystal element including a P-type zone, an N-type zone and a rectifying boundary between said zones, a first metallic layer bonded to a portion of the surface of said P-type zone, a second metallic layer bonded to a portion of the surface of said N-type zone, a lead wire for each zone, and an electrically conductive vitreous bond between said metallic layer and said lead wire.

27. A crystal rectifier, as defined in claim 26 which also includes a vitreous envelope bonded to and surrounding said crystal element.

28. A crystal rectifier, as defined in claim 27 in which said second metallic layer includes a donor layer bonded to said N-type zone, a copper layer bonded to said donor layer, and a silver layer bonded to said copper layer.

29. A semi-conductor crystal rectifier comprising a semi-conductor crystal having an internal rectifying zone, a pair of electrodes electrically connected to said crystal, and a solid vitreous envelope surrounding said crystal and forming a vitreous bond with said crystal.

30. A crystal rectifier, as defined in claim 29 which includes a donor layer bonded to a surface of said crystal.

31. A semi-conductor crystal rectifier comprising a crystal element, two lead wires electrically connected to substantially opposite surface-portions on said element, and a vitreous envelope bonded to and surrounding said element.

32. An electrical translating device comprising a vitreous envelope, a monatomic semi-conductor crystal member within said envelope, first and second electrical conductors, means forming electrical connections between said first and second conductors, respectively, and said member, said means having a melting point at least equal to the melting point of said envelope, and a vitreous seal between said envelope and each of said conductors.

33. An electrical translating device as defined in claim 32, wherein said vitreous seal includes a glass bead fused to said envelope, said bead being bonded to its respective conductor.

34. An electrical translating device comprising a glass envelope, a monatomic semi-conductor crystal member within said envelope, first and second lead wires, first and second means forming electrical connections between said first and second lead wires, respectively, and said member, said second means being adherently bonded to said member, each of said means having a melting point at least equal to the melting point of said envelope, and direct glass-to-metal seals between said wires and said envelope.

35. An electrical translating device as defined in claim 34, wherein each of said seals includes a glass bead forming a glass-to-glass seal with said envelope, and a glass-to-metal seal with its respective lead wire.

36. An electrical translating device comprising a glass envelope, a monatomic semi-conductor crystal member within said envelope, first and second metallic electrodes, an electrical connection between each of said electrodes and said member, each connection including an electrically conductive welded connection within said envelope, and a glass-to-metal seal between said envelope and each of said electrodes.

37. An electrical translating device as defined in claim 36, wherein said welded connection between said first electrode and said member includes a metallic layer bonded to at least a portion of the surface of said member, and a welded joint between said layer and the inner end of said first electrode.

38. An electrical translating device comprising a vitreous envelope, a monatomic semi-conductor crystal member within said envelope, said member having two pairs of opposed surfaces, first and second metallic electrodes connected to one of said pairs of opposed surfaces, respectively, third and fourth metallic electrodes connected to the other of said pairs of opposed surfaces, respectively, and a vitreous seal between said envelope and each of said electrodes.

39. An electrical translating device as defined in claim 38, and an electrically conductive vitreous bond between said member and at least one of said electrodes.

40. An electrical translating device comprising a glass envelope, a semi-conductor crystal member within said envelope, said member having a pair of opposed concave surfaces and another surface interconnecting said concave surfaces, a pair of metallic electrodes extending through said envelope, said pair of metallic electrodes being electrically connected to said pair of concave surfaces, respectively, a third metallic electrode extending through said envelope, said third metallic electrode being electrically connected to said other surface, and a glass-to-metal seal between said envelope and each of said electrodes.

41. An electrical translating device comprising a glass envelope having first and second ends; a semi-conductor crystal member within said envelope adjacent said first end, said member having a concave surface facing said first end; a metallic electrode, extending through the second end, connected to said member; a glass-to-metal seal between said envelope and said electrode; and an electrical conductor bonded to said envelope at said first end to form a gas-tight seal with said envelope, said conductor being electrically connected to said member.

42. An electrical translating device as defined in claim 41, and a glass lens contacting said concave surface of said member.

43. An electrical translating device as defined in claim 42, wherein said lens and said conductor completely surround said concave surface.

44. An electrical translating device comprising a vitreous envelope, a monatomic semi-conductor crystal member within said envelope, first and second metallic electrodes connected to said member, glass beads fused to said electrodes, respectively, to form gas-tight seals with their respective electrodes, each of said beads being fused to said envelope, and an electrically conductive vitreous bond between one of said electrodes and said member.

45. An electrical translating device comprising a glass envelope, a monatomic semi-conductor crystal member within said envelope, said member having a pair of spaced portions, first and second metallic electrodes connected to said portions, respectively, a metallic layer bonded to another portion of said member, a third metallic electrode, an electrically conductive vitreous bond connected between said metallic layer and said third electrode, and a glass-to-metal seal between said envelope and each of said electrodes.

46. An electrical translating device comprising a glass envelope, a monatomic semi-conductor crystal member within said envelope, said member having a pair of spaced portions, first and second metallic electrodes connected to said portions, respectively, a third metallic electrode, a welded joint between said third electrode and another portion of said member, said welded joint being within said envelope, and a glass-to-metal seal between said envelope and each of said electrodes.

47. A semiconductor crystal device comprising: a glass envelope; a semiconductor crystal member within said envelope; first and second electrical conductors extending through said envelope and forming glass-to-metal seals with said envelope; and first and second electrical connectors between said first and second conductors, respectively, and said crystal member, at least one of said electrical connectors including an insulative binder mechanically coupling said member to the electrode and a plurality of finely divided electrically conductive metallic particles dispersed throughout said binder and forming an electrical connection between said electrode and said member.

48. The semiconductor crystal device defined in claim 47, wherein said crystal member includes a semiconductor crystal element and a metallic layer on a surface of said crystal element, said metallic particles forming an electrical connection between said electrode and said metallic layer.

49. The semiconductor crystal device defined in claim 47 wherein said electrically conductive metallic particles are silver.

50. The semiconductor crystal device defined in claim 49 wherein said insulative binder is composed of vitreous material.

51. The semiconductor crystal device defined in claim 47 wherein said one electrical connector is capable of withstanding temperatures of the order of 500° C.

52. The semiconductor crystal device defined in claim 47 wherein said one connector is capable of withstanding temperatures within the range from 400° C. to 600° C.

53. A semiconductor crystal device comprising: a vitreous envelope; a semiconductor crystal member within said envelope; first and second electrical conductors extending through said envelope; means forming a rectifying connection between one of said conductors and said member; and an ohmic mechanical connector between the other of said conductors and said member, said ohmic connector including an insulative bond mechanically coupling said member to said other conductor and a plurality of electrically conductive metallic particles dispersed throughout said bond and forming an electrical connection between said other electrode and said member; and a vitreous seal between said envelope and each of said conductors.

54. A semiconductor crystal device comprising: a vitreous envelope; a semiconductor crystal member within said envelope; first and second electrical conductors extending through said envelope; first means forming an asymmetrically conductive electrical connection between said first conductor and said member; second means forming an ohmic connection between said second conductor and said member, said second means being adherently bonded to said member and being capable of withstanding a temperature of the order of 500° C.; and a vitreous seal between said envelope and each of said conductors.

55. A semiconductor crystal device comprising: a vitreous envelope; a semiconductor crystal member within said envelope; first and second electrical conductors extending through said envelope; asymmetrically conductive connecting means between said first conductor and said member; ohmically conductive connecting means adherently bonded between said second conductor and said member, each of said connecting means being capable of withstanding a temperature of the order of 500° C.; and a vitreous seal between said envelope and each of said conductors.

56. In an electrical translating device, the combination comprising: a semiconductor crystal member; an electrode having one end positioned adjacent said member; and electrically conductive mechanical connecting means between said electrode and said member, said connecting means including an insulative binder mechanically coupling said member and said one end of said electrode and a plurality of electrically conductive metallic particles dispersed throughout said binder and forming an ohmic electrical connection between said member and said one end of said electrode.

57. The combination defined in claim 56 wherein said crystal member includes a semiconductor crystal element and a metallic layer on a surface of said crystal element, said metallic particles forming an electrical connection between said electrode and said metallic layer.

58. The combination defined in claim 56 wherein said metallic particles are a precious metal.

59. A semiconductor crystal rectifier comprising: a vitreous envelope having first and second ends; a first electrode extending through said first end of said envelope, said electrode having one end positioned within said envelope; a first vitreous bead fused over said electrode and contiguous with said one end thereof; a semiconductor crystal member; means for mounting said crystal member on said one end of said electrode and the adjacent portion of said bead whereby said crystal member is supported by said electrode and said bead; a second electrode extending through said second end of said envelope; a rectifying contact between said second electrode and said crystal member; a second vitreous bead fused over said second electrode; and a vitreous seal between said envelope and each of said beads.

60. A semiconductor device comprising a vitreous envelope having an inner chamber and including an elongated tubular body section of substantially uniform external cross section at right angles to the direction of elongation thereof and having a maximum cross sectional dimension at right angles to said direction of elongation of the order of one tenth inch, and first and second solid massive end sections, at least the major portion, lengthwise of each of said end sections constituting a solid vitreous member having a cross section at right angles to said direction of elongation substantially equal to said external cross section of said tubular body section; first and second solid, one piece ductile lead wires extending through said first and second end sections, respectively, along the median line, substantially, in the direction of elongation of said body section and hermetically and directly sealed to said end sections, each of said lead wires having a first end terminating within said chamber, a semiconductor element affixed to, supported by and electrically connected to the first end of said first lead wire; and a resilient element affixed to and supported by the first end of said second lead wire and contacting said semiconductor element; the length of the seal between each lead wire and the respective end section being at least 1.5 times the maximum cross sectional dimension of the lead wire, and the transverse outside dimension of the said major portion of each of said end sections being at least of the order of five times the maximum cross sectional dimension of the corresponding lead wire.

61. A semiconductor device comprising an elongated vitreous envelope having an inner chamber and including an elongated tubular body of substantially cylindrical shape and having a substantially uniform external diameter having a magnitude in the neighborhood of one-tenth inch, and first and second end sections, at least the major portion of each of said end sections constituting a cylindrical solid vitreous member having a cross section at right angles to the direction of elongation of said body equal to said external cross section of said tubular body section; first and second solid, one-piece ductile lead wires extending through said first and second end sections, respectively, along the median line, substantially, of said vitreous envelope in the direction of elongation thereof, and hermetically and directly sealed to said end sections, each of said lead wires having a first end terminating within said chamber, a semiconductor element affixed to, supported by and electrically connected to the first end of said first lead wire; and a resilient metallic element affixed to and supported by the first end of said second lead wire and contacting said semiconductor element: the length of the seal between each of said lead wires and the respective end section being at least 1.5 times the maximum cross sectional dimension of the sealed portion of the lead wire, and the transverse outside dimension of the said major portion of each of the end sections of said envelope being at least of the order of five times the maximum cross sectional dimension of said lead wire.

References Cited in the file of this patent

UNITED STATES PATENTS

| Number | Name | Date |
|---|---|---|
| D. 156,501 | Gates | Dec. 20, 1949 |
| 756,676 | Midgley | Apr. 5, 1904 |
| 817,664 | Plecher | Apr. 10, 1906 |
| 1,782,129 | Andre | Nov. 18, 1930 |
| 1,899,569 | Howe | Feb. 28, 1933 |
| 1,908,316 | Bush | May 9, 1933 |
| 2,078,892 | McCullough | Apr. 27, 1937 |
| 2,137,428 | Van Geel et al. | Nov. 22, 1938 |
| 2,279,268 | Adams | Apr. 7, 1942 |
| 2,361,962 | Ronay | Nov. 7, 1944 |
| 2,402,582 | Scaff | June 25, 1946 |
| 2,447,829 | Whaley | Aug. 24, 1948 |
| 2,453,772 | Whitfield | Nov. 16, 1948 |
| 2,460,109 | Southworth | Jan. 25, 1949 |
| 2,469,569 | Ohl | May 10, 1949 |
| 2,486,776 | Barney | Nov. 1, 1949 |
| 2,516,344 | Ross et al. | July 25, 1950 |
| 2,524,035 | Bardeen et al. | Oct. 3, 1950 |
| 2,567,970 | Scaff et al. | Sept. 18, 1951 |
| 2,597,028 | Pflann | May 20, 1952 |

FOREIGN PATENTS

| Number | Country | Date |
|---|---|---|
| 582,566 | Great Britain | Nov. 26, 1946 |
| 604,460 | Great Britain | July 5, 1948 |
| 632,942 | Great Britain | Dec. 5, 1949 |

OTHER REFERENCES

O. S. R. D. Report 14-341, PB-5200, declassified December 14, 1945, pages 7-9.

Serial No. 359,951, Schmellenmeier (A. P. C.), published May 25, 1943.